(12) United States Patent
Malloy, III et al.

(10) Patent No.: US 10,147,506 B2
(45) Date of Patent: Dec. 4, 2018

(54) CONFORMAL CORE COOLING AND CONTAINMENT STRUCTURE

(71) Applicant: BWXT mPower, Inc., Charlotte, NC (US)

(72) Inventors: John D. Malloy, III, Goode, VA (US); Michael J. Edwards, Forest, VA (US); Tyler A. Edwards, Lynchburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 1031 days.

(21) Appl. No.: 14/244,222

(22) Filed: Apr. 3, 2014

(65) Prior Publication Data

US 2018/0322967 A1    Nov. 8, 2018

(51) Int. Cl.
G21C 9/016    (2006.01)
G21C 11/08    (2006.01)

(52) U.S. Cl.
CPC .............. *G21C 9/016* (2013.01); *G21C 11/08* (2013.01)

(58) Field of Classification Search
CPC ......... G21C 9/016; G21C 9/012; G21C 11/08
See application file for complete search history.

(56) References Cited

U.S. PATENT DOCUMENTS

| | | | |
|---|---|---|---|
| 3,702,802 A * | 11/1972 | Jansen | G21C 1/02 376/280 |
| 3,979,866 A | 9/1976 | Prescott | |
| 4,783,310 A * | 11/1988 | Keegan | G21C 11/08 250/519.1 |
| 5,319,687 A | 7/1994 | Henry | |
| 5,406,602 A | 4/1995 | Hunsbedt et al. | |
| 5,577,085 A | 11/1996 | Gou et al. | |
| 5,659,589 A | 8/1997 | Wistuba et al. | |
| 5,699,394 A | 12/1997 | Schreiber et al. | |
| 5,825,838 A | 10/1998 | Park et al. | |

(Continued)

FOREIGN PATENT DOCUMENTS

GB    2236210    3/1991

OTHER PUBLICATIONS

International Search Report and Written Opinion dated Jul. 27, 2015 for PCT/US2015/024044.

*Primary Examiner* — Sharon M Davis
(74) *Attorney, Agent, or Firm* — Nelson Mullins Riley & Scarborough LLP

(57) ABSTRACT

A nuclear reactor includes a pressure vessel and a nuclear reactor core comprising fissile material disposed inside the pressure vessel at the bottom of the pressure vessel. A secondary core containment structure includes a containment basket comprising insulation with a maximum stable temperature of at least 2200K cladded by steel. The bottom of the pressure vessel and the nuclear reactor core are disposed inside the containment basket with the containment basket spaced apart from the bottom of the pressure vessel by a clearance gap. The containment basket may comprise zirconia insulation cladded by steel. In some embodiments the clearance gap between the containment basket and the bottom of the pressure vessel is no larger than one meter. The secondary core containment structure may further comprise conduits arranged to inject water into the clearance gap between the containment basket and the bottom of the pressure vessel.

15 Claims, 7 Drawing Sheets

(56) References Cited

U.S. PATENT DOCUMENTS

| | | | |
|---|---|---|---|
| 6,195,405 B1 * | 2/2001 | Hwang | G21C 9/016 376/280 |
| 6,353,651 B1 | 3/2002 | Gou et al. | |
| 6,810,099 B2 | 10/2004 | Nakamaru et al. | |
| 7,558,360 B1 | 7/2009 | Gamble et al. | |
| 7,949,084 B2 | 5/2011 | Song et al. | |
| 8,358,732 B2 | 1/2013 | Sato et al. | |
| 8,401,142 B2 | 3/2013 | Keegan et al. | |
| 2002/0085660 A1 | 7/2002 | Nakamaru et al. | |
| 2007/0092053 A1 | 4/2007 | Sato | |
| 2008/0198960 A1 | 8/2008 | Keegan et al. | |
| 2009/0080589 A1 | 3/2009 | Sato et al. | |
| 2009/0116607 A1 | 5/2009 | Song et al. | |
| 2010/0239061 A1 | 9/2010 | Aoki et al. | |
| 2012/0051485 A1 | 3/2012 | Goda et al. | |
| 2012/0121056 A1 | 5/2012 | Sato et al. | |

\* cited by examiner

CONFORMAL CORE COOLING AND CONTAINMENT STRUCTURE

This invention was made with Government support under Contract No. DE-0000583 awarded by the Department of Energy. The Government has certain rights in this invention.

BACKGROUND

The following relates to the nuclear power generation arts, nuclear reactor safety arts, nuclear reactor emergency core cooling (ECC) arts, and related arts.

In a loss of coolant accident (LOCA) or other event in which the pressure vessel of a nuclear power plant is depressurized, the nuclear reactor core is to be kept immersed in water so as to provide for removal of decay heat and to prevent exposure of the fuel rods to air which can lead to chemical reactions and release of airborne radioactivity. The system which provides this water injection is referred to as the emergency core cooling (ECC) system. In a typical arrangement, high pressure water injection tanks employing passive nitrogen pressurization operate during the initial reactor depressurization to force pressurized water into the reactor pressure vessel to ensure the reactor core remains immersed in water during the depressurization process. After the reactor is depressurized, a refueling water storage tank (RWST) located with the nuclear reactor at an elevated position inside the radiological containment is drained into the reactor pressure vessel. This flow of water is a passive, gravity-driven process, and with a suitably sized RWST can be continued without any supply of external power or water for a design period of hours or days. In the case of a LOCA, steam or two-phase steam/water mixture is discharged from the reactor pressure vessel into the surrounding radiological containment, and this water condenses and collects in a sump of the radiological containment. A sump pump may be provided to recover this water into the RWST. Closed heat exchange loops may also be provided to form steam cycle heat transfer from the pressure vessel to the RWST or to other heat dissipation systems. These systems allow the reactor to be shut down in the case of a LOCA or other sudden depressurization event with little or no damage to the nuclear reactor core.

Additionally, nuclear regulatory rules, e.g. promulgated by the Nuclear Regulatory Commission (NRC) in the United States, typically require that the nuclear power plant incorporate safety systems to protect against the possibility of loss of reactor core cooling to an extent resulting in some melting of the reactor core. In conventional light water reactors employing $^{235}$U as the fissile radioisotope, the nuclear fuel is typically in the form of uranium dioxide ($UO_2$) which has a melting point of around 3100K. At this temperature, the nuclear fuel assemblies and the steel structures around the nuclear reactor core melt and form a molten mass of material that is referred to in the art as "corium".

In an ex-vessel retention approach, the nuclear power plant is designed for a contingency in which the corium relocates to the bottom of the reactor vessel, melts through the bottom of the reactor pressure vessel, and collects on the containment floor below the reactor vessel. In the ex-vessel retention approach, the floor below the reactor vessel is lined with high temperature zirconia thermal insulation tiles to minimize interaction with the underlying concrete forming the floor of the sump. In most scenarios, the sump is filled with water, e.g. condensed steam released by a LOCA. The molten corium spreads out over the sump floor, expanding its surface area and rapidly cooling. If the corium melts through the pressure vessel rapidly, then the potential exists for a steam explosion when the corium comes into rapid contact with water in the sump of the radiological containment structure. This steam explosion can be a challenge to the structural design of the containment structure.

In an in-vessel retention approach, a flow channel is provided between the reactor pressure vessel and the surrounding insulation panels. This flow channel is designed to allow water flow around the lower vessel when the reactor cavity (i.e. radiological containment sump) is flooded. The goal is to cool the vessel sufficiently to prevent the corium inside the vessel from melting though the vessel shell, thereby mitigating the likelihood of an ex-vessel steam explosion scenario. However, in-vessel retention potentially allows long-term exposure of the molten corium to air which can lead to release of airborne fission products. The survival of the lower vessel is also dependent upon the amount of molten material, its melt temperature, and physical configuration of molten layers on the bottom of the vessel. In view of this, nuclear regulatory rules typically require that a nuclear power plant designed for in-vessel retention additionally be designed to account for an ex-vessel corium relocation contingency, including the possibility of a steam explosion due to rapid melting of the pressure vessel and corium contact with water collected in the vessel cavity.

BRIEF SUMMARY

In one disclosed aspect, an apparatus comprises a pressurized water reactor (PWR) including a pressure vessel and a nuclear reactor core comprising fissile material disposed inside the pressure vessel at the bottom of the pressure vessel, and a secondary core containment structure including: a containment basket comprising zirconia insulation containing the bottom of the pressure vessel, the containment basket spaced apart from the bottom of the pressure vessel by a clearance gap, the containment basket having an open top located at an elevation above the top of the nuclear reactor core; and conduits disposed between the containment basket and the bottom of the pressure vessel and having inlets above the top of the containment basket and outlets inside the containment basket.

In another disclosed aspect, an apparatus comprises a nuclear reactor including a pressure vessel and a nuclear reactor core comprising fissile material disposed inside the pressure vessel at the bottom of the pressure vessel, and a secondary core containment structure including a containment basket comprising insulation with a maximum stable temperature of at least 2200K cladded by steel. The bottom of the pressure vessel and the nuclear reactor core are disposed inside the containment basket with the containment basket spaced apart from the bottom of the pressure vessel by a clearance gap.

In another disclosed aspect, a secondary core containment structure includes a containment basket comprising insulation with a maximum stable temperature of at least 2200K cladded by steel and sized to receive the portion of a pressurized water reactor (PWR) containing a nuclear reactor core comprising fissile material with a clearance gap between the containment basket and the received portion of the PWR.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
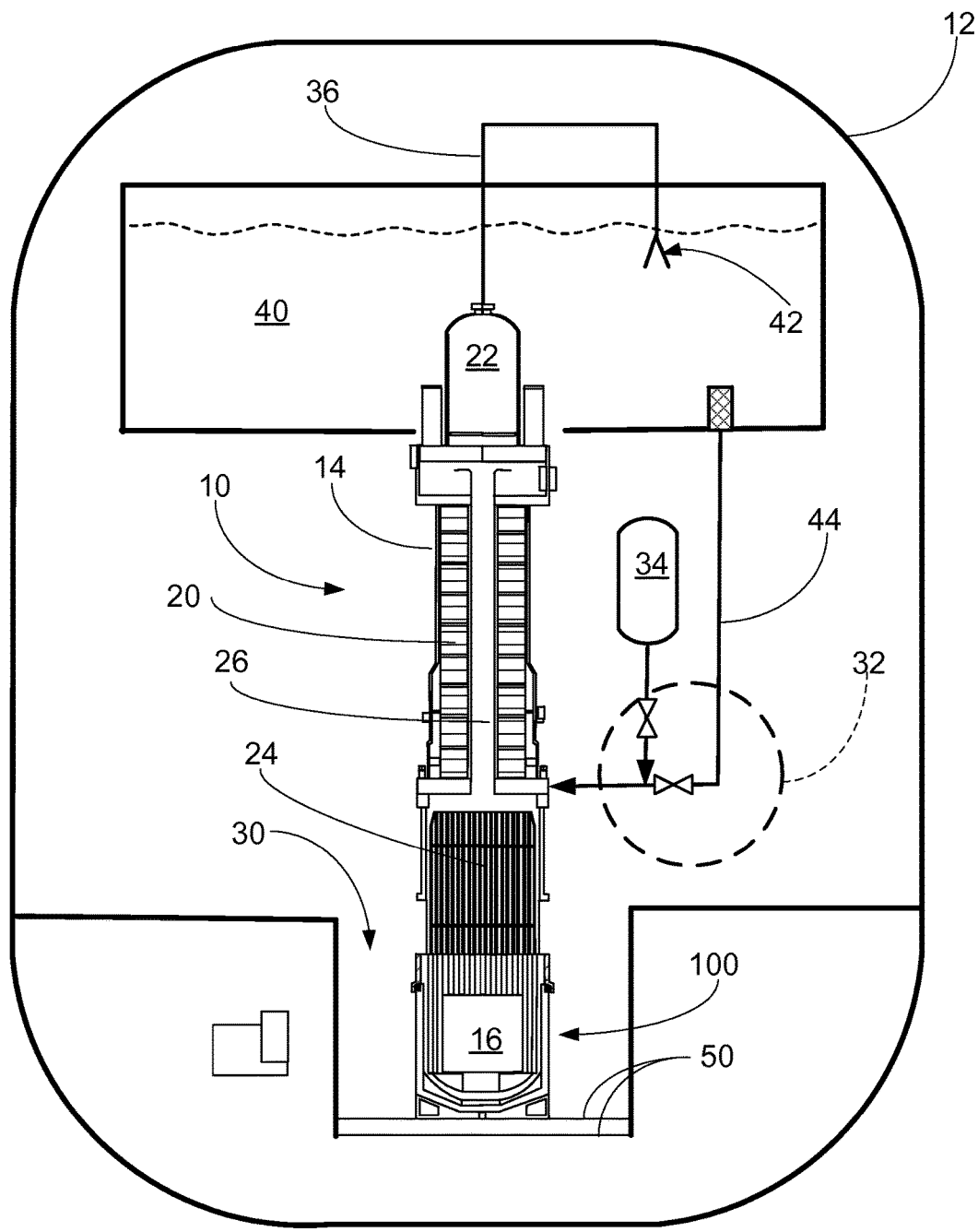
FIG. 1 shows a diagrammatic cutaway perspective view of an illustrative small modular reactor (SMR) disposed in a radiological containment structure along with the secondary core containment structure disclosed herein.

With reference to FIG. 1, a cutaway perspective view is shown of an illustrative small modular reactor (SMR) 10 disposed in a radiological containment structure 12. The radiological containment structure 12 is sometimes referred to in the art more briefly as the containment structure, or as containment, and typically comprises a concrete or steel-reinforced concrete structure, although a steel containment is also contemplated. The containment 12 may be subterranean, or above-ground, or partially underground and partially above-ground. The illustrative SMR 10 is a pressurized water reactor (PWR) 10 including a pressure vessel 14 and a nuclear reactor core 16 disposed inside the pressure vessel 14 at a bottom of the pressure vessel 14. The nuclear reactor core 16 suitably comprises fissile material such as uranium dioxide ($UO_2$) pellets containing uranium enriched in the fissile $^{235}U$ isotope, e.g. with an enrichment of 5% or less. During normal operation the pressure vessel 14 contains (primary) coolant water (more generally herein, simply "coolant" or "coolant water") in which the nuclear reactor core 16 is immersed.

The illustrative PWR 10 is an integral PWR in which one or more integral steam generators 20 are disposed inside the pressure vessel 14. Alternatively, an external steam generator may be employed. The illustrative SMR 10 also includes an integral pressurizer 22 defined at the top of the pressure vessel 14 which in normal operation contains a steam bubble whose pressure is adjusted by operation of resistive heaters, spargers, or the like so as to adjust the pressure of the primary coolant. Alternatively, an external pressurizer may be employed that is connected with the pressure vessel by suitable piping. During normal operation the nuclear chain reaction in the nuclear reactor core 16 is controlled by mechanical insertion/withdrawal of neutron-absorbing control rods operated by control rod drive mechanisms (CRDMs)—this mechanical reactivity control system is generally indicated in FIG. 1 by reference number 24. The illustrative system 24 employs internal CRDMs; alternatively, external CRDMs may be employed in which the motor stators are located outside of the pressure boundary, e.g. above the top of the pressure vessel. The primary coolant flow circuit in the illustrative SMR 10 is defined by a cylindrical central riser 26—water heated by the reactor core 16 flows upward through the central riser 26 and returns downward in a downcomer annulus defined between the central riser 26 and the pressure vessel 14. In the illustrative integral SMR 10 the steam generators 20 are located in the downcomer annulus, and secondary coolant water flows into and out of the steam generators 20 via suitable vessel penetrations.

The radiological containment structure 12 has a sump 30 in which the bottom of the pressure vessel 14 is disposed. During normal operation, the sump 30 is typically empty, although it is contemplated to partially or fully flood the sump 30 during normal operation. In the event of a loss of coolant accident (LOCA) in which a break in the pressure vessel 14 allows coolant to escape into containment 12, the coolant (which is typically released in the form of steam or a two-phase water/steam mixture) condenses and collects in the sump 30 and/or at another collection location inside containment 12. In response to certain events such as a LOCA or a loss of heat-sinking event (e.g. loss of secondary coolant through the steam generator 20), the safety systems perform a rapid depressurization of the pressure vessel 14 with suitable provisions to ensure that the reactor core 16 remains immersed in water during the depressurization. In the illustrative embodiment this is achieved by opening valving 32 to inject pressurized water from an intermediate pressure injection tank (IPIT) 34 located inside containment 12 into the pressure vessel 14 during the depressurization phase of the response. The pressurized water in the IPIT 34 is typically nitrogen pressurized, and optionally contains a soluble boron component or other neutron poison that ensures rapid extinction of the nuclear chain reaction in the reactor core 16. The depressurization is by way of a vent line 36 that conducts primary coolant in the form of steam or two-phase steam/water mixture into a refueling water storage tank (RWST) 40 located inside containment 12, and/or into a condenser or other receptacle or sink. In the illustrative example, the vent line 36 discharges into the RWST 40 via spargers 42. In the case of a LOCA, some steam or two-phase steam/water mixture from the SMR 10 is also output via the LOCA vessel penetration break directly into containment 12 to be collected as condensate in the sump 30 or elsewhere inside containment; whereas, in a loss of heatsinking event the vent line 36 preferably is the sole depressurization path although safety pressure relief valves may also be provided on the pressure vessel 14.

After the reactor pressure vessel 14 is depressurized (below a specified low pressure threshold), the valving 32 closes off the IPIT 34 and opens a drain line 44 to drain water from the RWST 40, which is at an elevated position respective to the nuclear reactor core 16, into the pressure vessel 14 by gravity feed. This provides long-term cooling to remove residual decay heat from the reactor core 16, and also ensures that the reactor core 16 remains immersed in water over the long-term cooling. "Long-term" is in this context a design-basis parameter, and may for example be an interval of 48 hours, or 14 days, or so forth. Typically, nuclear regulatory rules require that the water source (RWST 40 in the illustrative example) have sufficient capacity for the long-term ECC process to run for the design period without any water replenishment. In practice, the vent line 36 may remain open during the long-term cooling so as to form a closed-loop steam cycle in which water drained from the RWST 40 into the pressure vessel 14 is converted to steam by decay heat from the core 16 and the steam is then sparged back into the RWST 40.

Not shown in FIG. 1 are mechanisms for transferring heat from inside containment 12 to an ultimate heat sink (UHS) located outside containment. These heat transfer mechanisms can take various forms, such as heat exchangers coupling into the RWST 40, auxiliary condensers located outside containment 12 and connected with the pressure vessel 14, or so forth. The ECC response may include other facets, such as flooding the sump 30 via a dedicated flood line (not shown). Additionally or alternatively in a LOCA scenario, steam escaping from the pressure vessel 14 typically condenses in the sump 30 to at least partially flood the sump 30.

The described ECC process is merely an illustrative example. More generally, the ECC process serves the functions of providing controlled depressurization of the pressure vessel while keeping the reactor core immersed in coolant water and, after depressurization, providing long-term removal of decay heat from the reactor core while keeping the reactor core immersed in coolant water. The ECC process is preferably designed to operate passively, that is, without requiring any externally supplied power in order to operate, and nuclear regulatory rules typically require various redundancies be built into the ECC systems, in terms of components (e.g. providing two or more RWST units with independent drain lines, two or more IPIT units, and so forth) and/or in terms of independent mechanisms (e.g., the nuclear chain reaction can be extinguished by either one of two independent mechanisms: passive gravity-driven scramming the control rods system 24, and injection via the IPIT 34 of pressurized water containing soluble neutron poison).

To provide a further level of safety, nuclear regulatory rules typically require independent reactor safety systems that are designed to accommodate a design basis event in which it is postulated that the ECC system is unable to keep the reactor core immersed in liquid water. In this postulated event, the reactor core 16 is exposed to air, begins to heat rapidly and ultimately melts surrounding steel and the uranium dioxide ($UO_2$) nuclear fuel itself to generate a molten mass known as corium.

In a known ex-vessel approach, it is assumed that the molten corium melts through the bottom of the pressure vessel 14 and relocates to the floor of the radiological containment structure 12, e.g. to the bottom of the sump 30 in the case of the illustrative containment 12. Thermal decomposition of containment concrete and interaction with the molten corium can lead to chemical reactions producing volatile radioactive aerosols, hydrogen, and other products that can lead to radiation release and/or explosion. Corium contact with water in the sump 30 can also lead to a steam explosion. In the illustrative example of FIG. 1, the floor of the sump 30 is lined with high temperature zirconia thermal insulation tiles 50 to minimize interaction with the underlying concrete forming the floor of the sump. However, in the safety paradigm disclosed herein the zirconia thermal insulation tiles 50 are provided as a second level "defense-in-depth" mechanism, and are not relied upon as the primary response to a core melting event.

Figure 2:
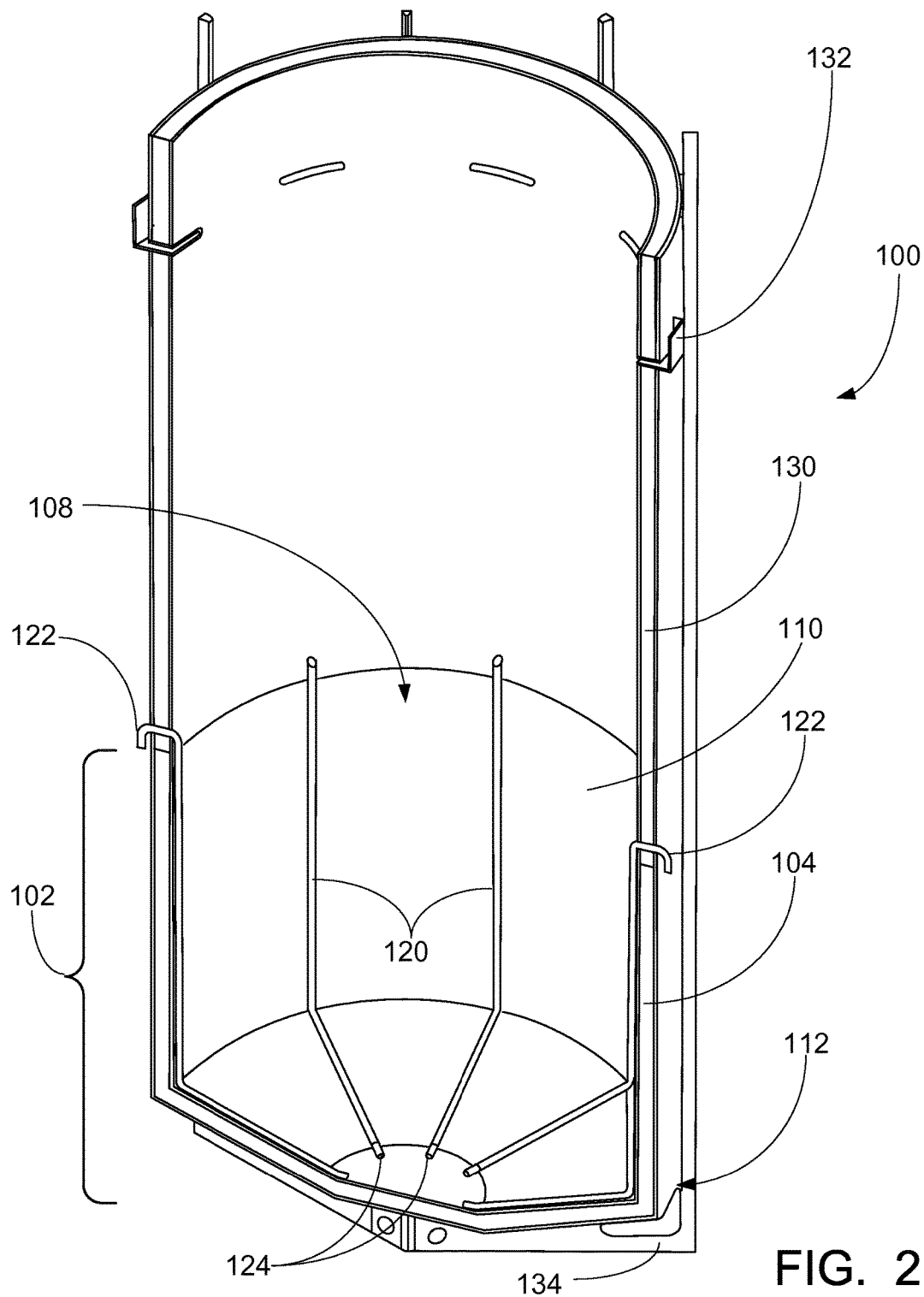
FIG. 2 diagrammatically shows an isolation cutaway perspective view of the secondary core containment structure.
Figure 3:
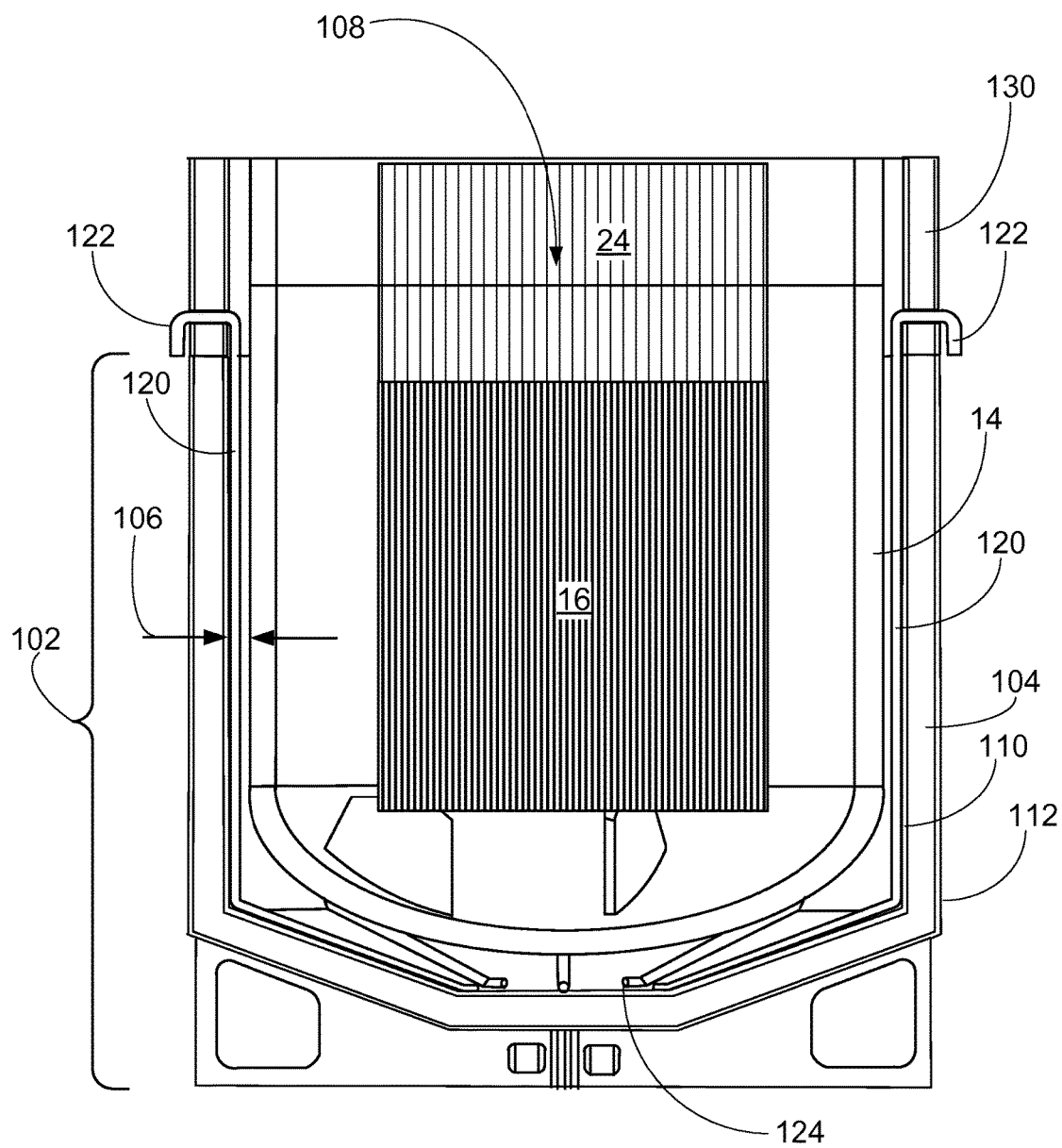
FIG. 3 diagrammatically shows a side sectional view of the containment basket of the secondary core containment structure and the bottom of the pressure vessel of the SMR disposed inside the containment basket.
Figure 4:
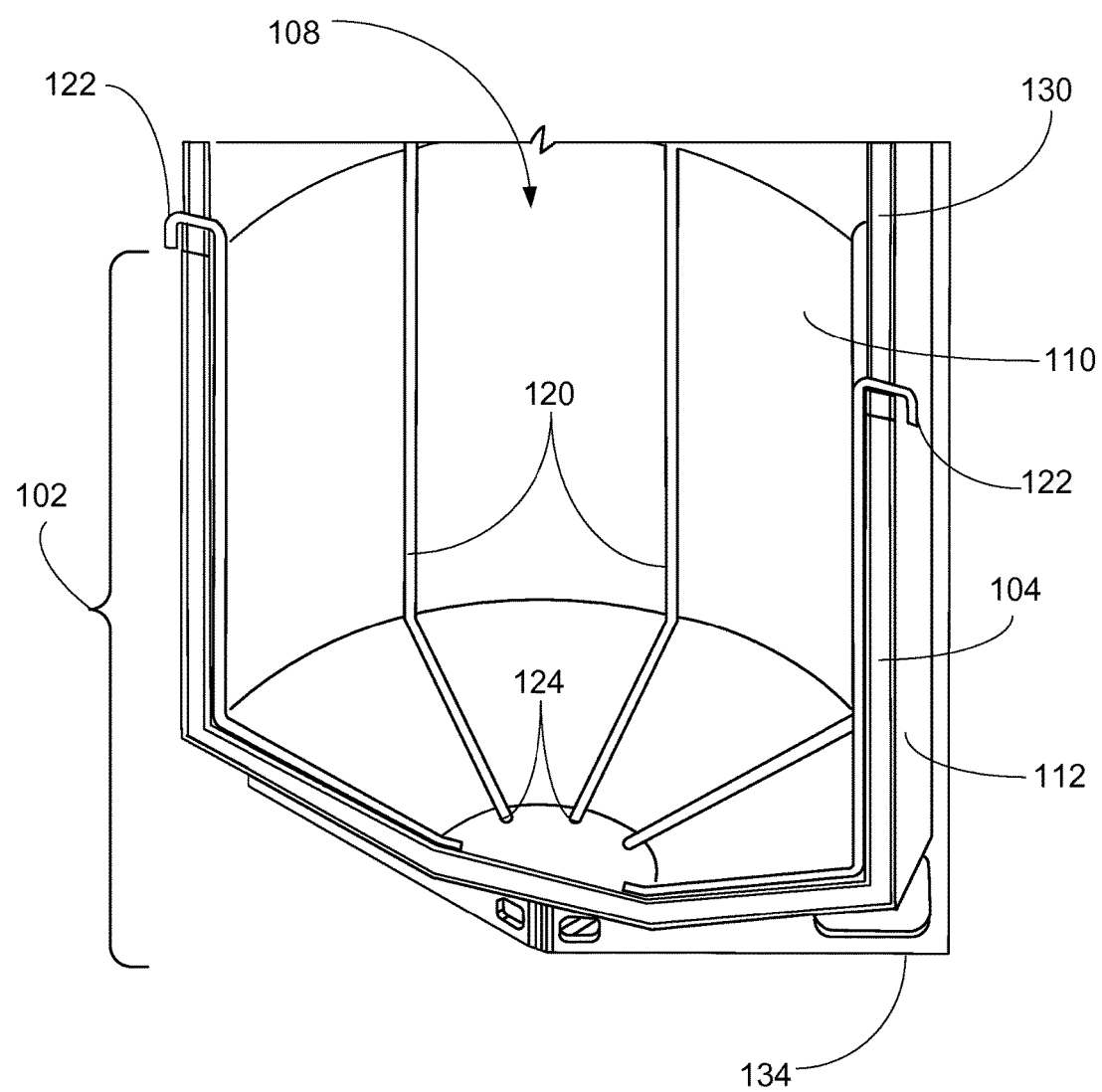
FIG. 4 diagrammatically shows an enlarged isolation cutaway perspective view of the secondary core containment structure focusing on the containment basket and the conduits.
Figure 5:
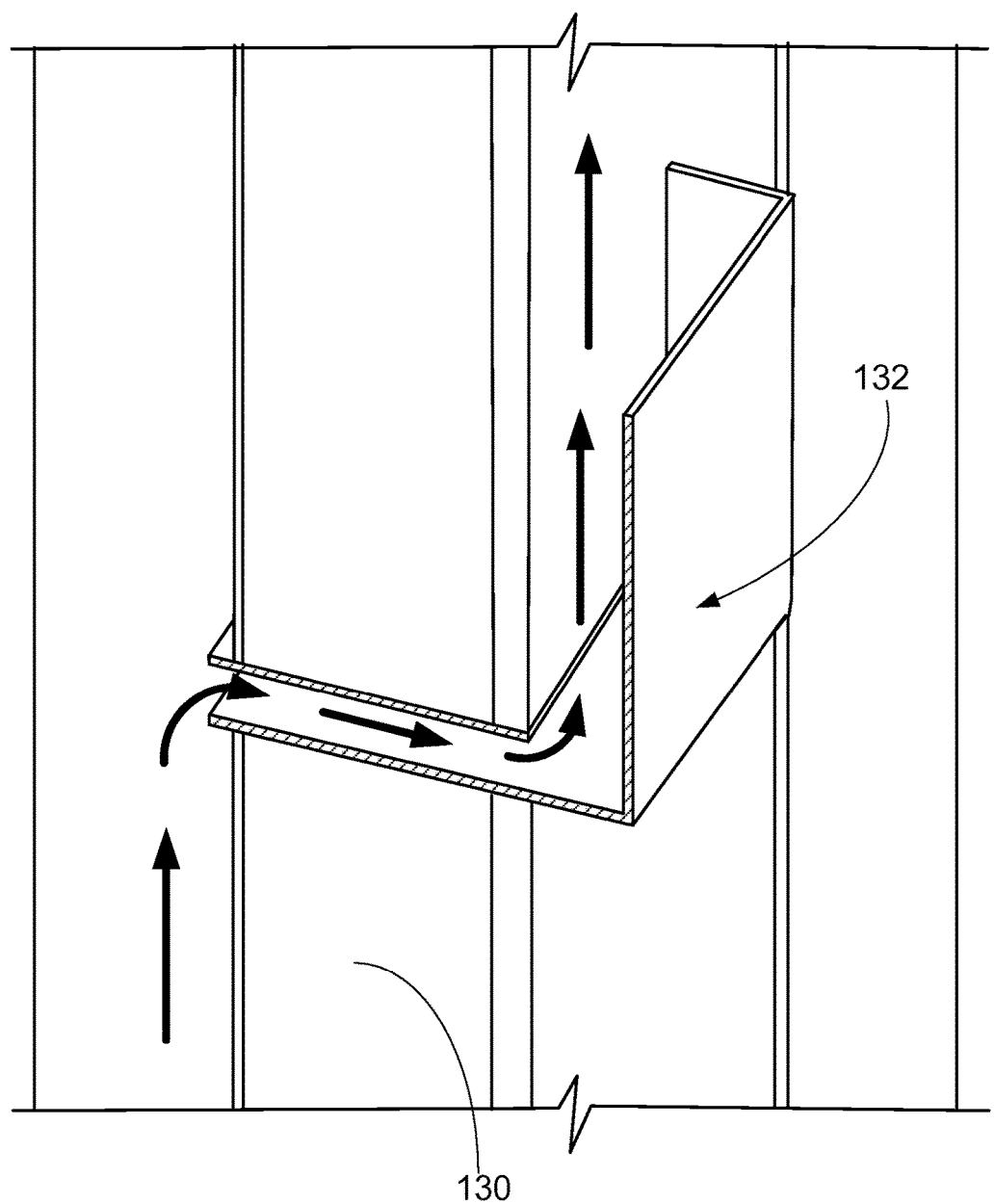
FIG. 5 diagrammatically shows an enlarged cutaway perspective view of steam vents of the secondary core containment structure.

With continuing reference to FIG. 1 and with further reference to FIGS. 2-5, it is disclosed herein to provide a secondary core containment structure 100 that includes a containment basket 102 comprising zirconia insulation 104 arranged to contain the bottom of the pressure vessel 14. The containment basket 102 is spaced apart from the bottom of the pressure vessel 14 by a clearance gap 106, and the containment basket 102 has an open top 108 located at an elevation above the top of the nuclear reactor core 16. In some embodiments the containment basket 102 further includes an inner steel liner 110 and an outer steel support structure 112, with the zirconia insulation 104 disposed (i.e. sandwiched) between the inner steel liner 110 and the outer steel support structure 112. In some embodiments, the secondary core containment structure 100 further includes conduits 120 disposed between the containment basket 102 and the bottom of the pressure vessel 14 having inlets 122 located above the top of the containment basket 102 and outlets 124 inside the containment basket, preferably discharging at or near the bottom of the containment basket 102. In some embodiments the secondary core containment structure 100 further includes a cylindrical collar 130 comprising refractory fiber insulation extending upward from the open top 108 of the containment basket 102 and optionally spaced apart from the pressure vessel by a clearance gap, which may be the same as, larger than, or smaller than, the clearance gap 106 of the containment basket 102. In the illustrative embodiment, the outer steel support structure 112 extends upward to also provide outer support for the cylindrical collar 130. Steam vents 132 are provided to vent steam generated in the clearance gap 106. The steam vents 132 may vent directly into the atmosphere inside the containment 12, or may be connected by piping to a steam reclamation or reservoir component, e.g. a sparger discharging into the RWST 40 (not shown). The illustrative secondary core containment structure 100 is bottom-supported by bottom supports 134 of the outer steel support structure 112; alternatively the secondary core containment structure may be supported in a suspended fashion by tie rods or the like whose upper ends are secured to a mid-flange of the pressure vessel or to another suitably strong anchor structure. FIG. 2 illustrates an isolation cutaway perspective view of the secondary core containment structure 100; FIG. 3 illustrates a side sectional view of the containment basket 102 of the secondary core containment structure 100 and the bottom of the pressure vessel 14 disposed inside the containment basket 102; FIG. 4 shows an enlarged isolation cutaway perspective view of the secondary core containment structure 100 focusing on the containment basket 102 and the conduits 120; and FIG. 5 shows an enlarged cutaway perspective view of steam vents 132 of the secondary core containment structure 100.

With particular reference to FIGS. 1-4, during an event in which the ECC system is brought into operation, the sump 30 is likely to begin filling with water, sourced from the reactor pressure vessel 14 via steam escaping a LOCA break, and/or from water escaping the RWST 40 via pressure relief valves (not shown), and/or via intended flooding of the sump 30 from the RWST 40. If the water level in the sump 30 rises above the level of the inlets 122, then water will flow via the inlets 122 into the conduits 120 to discharge via outlets 124 into the containment basket 102 so as to flood the clearance gap 106 between the containment basket 102 and the bottom of the pressure vessel 14. Additionally or alternatively, the inlets 122 may be connected with a water source, for example connected via piping to the RWST 40 so that water from the RWST 40 is gravity-fed into the clearance gap 106.

However, the total volume of water in the clearance gap 106 is limited by the conformal arrangement of the containment basket 102 respective to the bottom of the pressure vessel 14. For example, in some embodiments the containment basket 102 is conformal with the clearance gap 106 between the containment basket 102 and the bottom of the pressure vessel being no larger than about one meter, and in one arrangement preferably between about 3 inches and about 7 inches. The containment basket 102 is conformal respective to the bottom of the pressure vessel 14, that is, the clearance gap 106 is small, e.g. one meter or less, at all points along the bottom of the pressure vessel 14 where it is surrounded by the containment basket 102. If the clearance gap has a maximum value of d, then the maximum total volume of water contained in the clearance gap 106 is less than or about d·A where A is the total surface area of (the outside of) the bottom of the pressure vessel 14 surrounded by the containment basket 102. Note that the clearance gap may not be constant at all points around the bottom of the pressure vessel; for example, as seen in FIG. 3 the illustrative clearance gap 106 is largest at the curvature of the pressure vessel transitioning from the bottom to the sidewall, and is smallest along the sidewalls. Such a geometry is conformal in that the clearance gap 106 is everywhere less than or equal to some small value d, e.g. everywhere less than or equal to d=1 meter.

Figure 6:
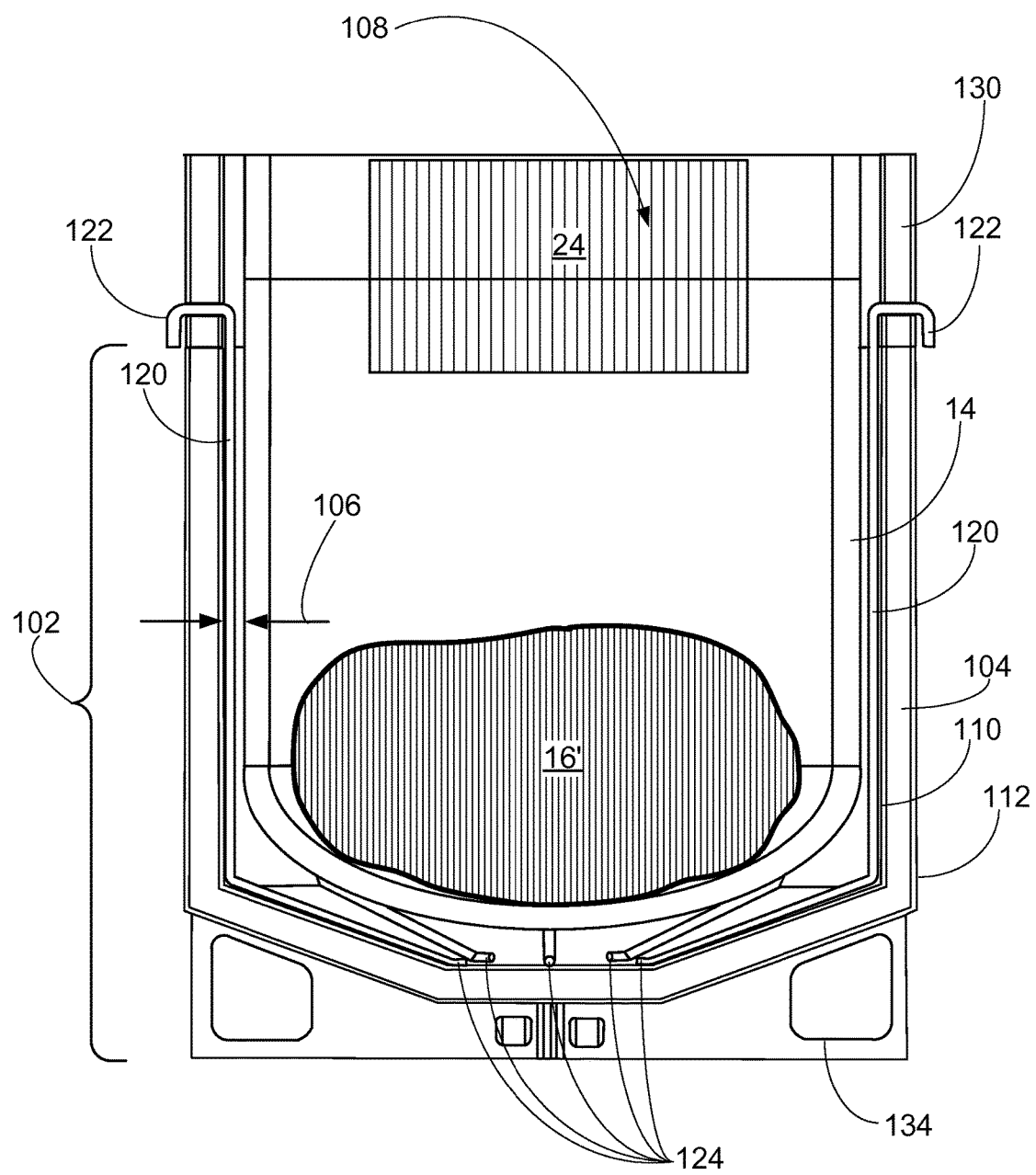
FIG. 6 diagrammatically shows a side sectional view of the containment basket of the secondary core containment structure and the bottom of the pressure vessel of the SMR during a core meltdown, at a state in which the corium is retained in the bottom of the pressure vessel and is being cooled by the secondary core containment structure.
Figure 7:
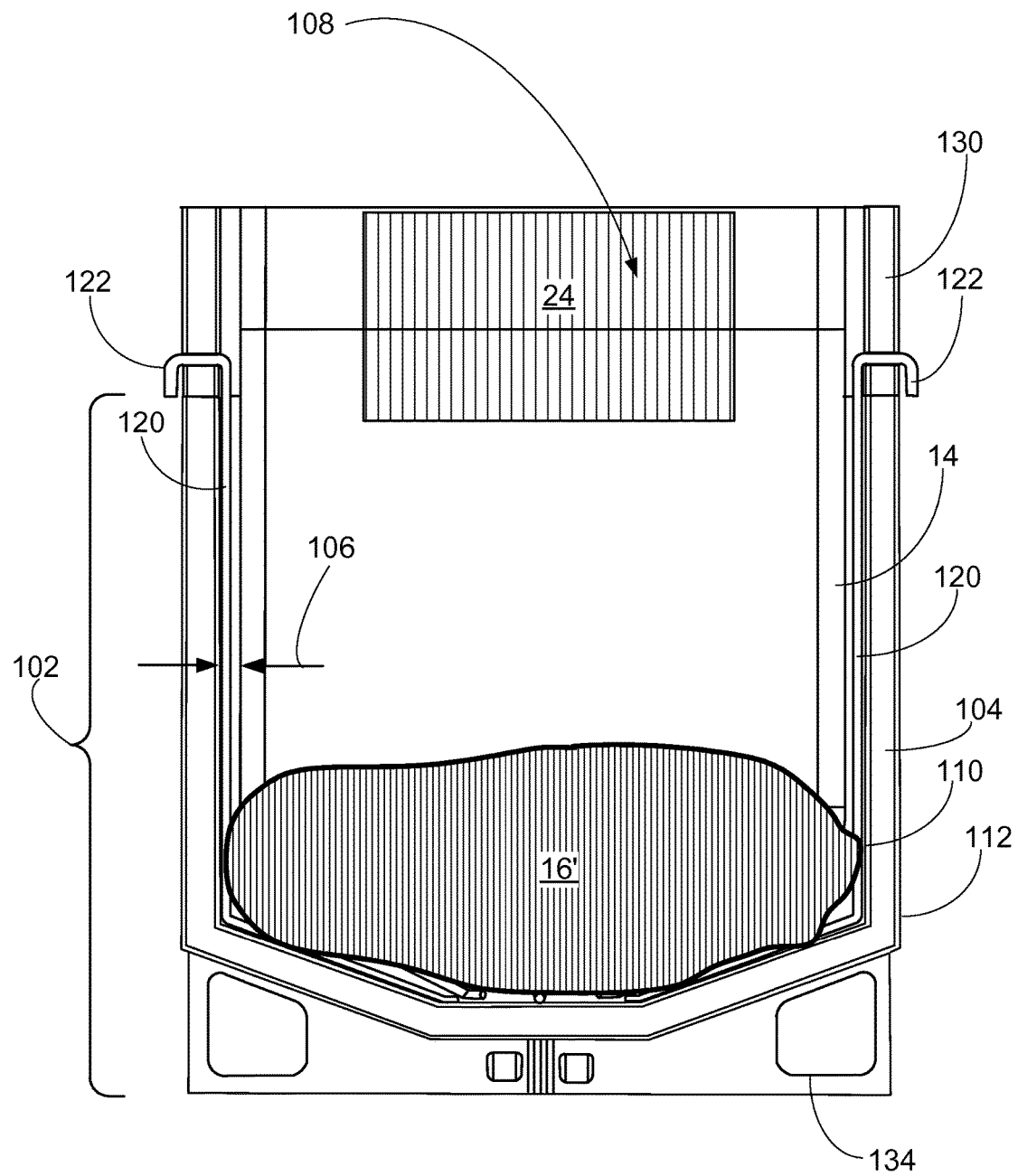
FIG. 7 diagrammatically shows a side sectional view of the containment basket of the secondary core containment structure and the bottom of the pressure vessel of the SMR during a core meltdown, at a state in which the corium has melted through the bottom of the pressure vessel but is being retained by the secondary core containment structure.

With reference now to FIGS. 6 and 7, operation of the secondary core containment structure 100 during a core melting event is described.

FIG. 6 illustrates a state in which the reactor core 16 has at least partially melted to form a corium mass 16' comprising various phase(s), mixture(s), alloy(s), or so forth of molten uranium dioxide, zirconium alloys (e.g., molten fuel rod cladding material), steel (e.g. molten spacer grid or other core structural steel material), and so forth. At the state diagrammatically illustrated in FIG. 6, the molten corium 16' is contained within the pressure vessel 14, and the secondary core containment structure 100 provides ex-vessel cooling but not corium retention functionality. To this end, water in the clearance gap 106 acts as a passive heat removal medium operating by natural circulation. The molten corium 16' relocates at or near the extreme bottom of the pressure vessel 14; accordingly, heat conducted from the corium 16' through the metal of the pressure vessel 14 to the water in the clearance gap 106 is primarily directed into the water at or near the bottom of the containment basket 102. This water boils to form steam or a two-phase steam/water mixture that rises upward to escape via the steam vents 132 (see FIGS. 2 and 5). Steam or two-phase steam/water escaping from the vents 132 may discharge directly into the containment 12 where it condenses and collects in the sump 30 or in another condensate reservoir, or alternatively the vents 132 may be connected via piping to spargers in the RWST 40 or to spargers in the sump 30. (In any credible event in which the reactor core 16 melts to form molten corium 16', a substantial volume of primary coolant can be expected to have discharged from the reactor pressure vessel 14 into containment 12, so that the sump 30 can be expected to contain substantial water.) If the vents 132 are piped to discharge into the source of water feeding the inlets 122 of the conduits 120, then a passive closed-loop cooling system is formed.

If the thermal output of the corium 16' is low enough, then the passive natural circulation cooling provided by the secondary core containment structure 100 is expected to provide sufficient cooling of the bottom of the pressure vessel 14 to prevent the molten corium 16' from breaching the pressure vessel 14. In this case, in vessel corium retention is achieved, which minimizes challenges to containment. The corium 16' does not come into contact with steam or concrete, thus preventing potentially problematic corium-concrete chemical reactions and/or steam explosions.

However, if the thermal output of the corium is sufficiently high then the passive natural circulation cooling provided by the secondary core containment structure 100 may not be sufficient to prevent a penetration through the bottom of the reactor pressure vessel 14. In this case (at least a portion of) the corium will melt through the bottom of the pressure vessel 14 and thus escape the containment of the pressure vessel 14.

With reference to FIG. 7, a corium mass 16" is illustrated, which has melted through the bottom of the pressure vessel 14. At this stage, the corium retention functionality of the secondary core containment structure 100 is brought to bear. The containment basket 102 provides the core retention. To this end, the zirconia insulation 104 disposed (i.e. sandwiched) between the inner steel liner 110 and the outer steel support structure 112 has a sufficiently high melting point that it does not melt even when it comes into direct contact with the corium 16". (The inner steel liner 110 does melt, and is absorbed into the corium 16".) The zirconia insulation 104 has a maximum stable temperature of at least 2200K, and more preferably at least 2500K, and in some embodiments at least 2800K, which is expected to be higher than the maximum temperature of the corium 16" after melting through the bottom of the pressure vessel 14. In some embodiments, the zirconia insulation 104 comprises zirconia boards made of yttria-stabilized zirconia fibers having a melting point of over 2800K. The zirconia boards are preferably arranged in an overlapping fashion to retain the corium 16" inside the containment basket 102 and prevent corium from escaping through gaps between the zirconia boards. Alternatively, the zirconia insulation 104 can be formed as a continuous basket shaped element. Because the zirconia insulation 104 is highly thermally insulating, the outer steel support structure 112 is protected from the heat of the corium 16" by the zirconia insulation 104, and does not melt. Accordingly, the outer steel support structure 112 remains intact even after the corium 16" melts through the bottom of the pressure vessel 14 and consumes the inner steel liner 110, so that the outer steel support structure 112 provides the mechanical support for retaining the corium 16" in the containment basket 102, while the zirconia insulation 104 provides the thermal robustness to allow the containment basket 102 to retain the corium 16". While zirconia is a suitable material for the insulation 104, it will be appreciated that other thermal insulation materials (e.g. alumina) with a maximum stable temperature of at least 2200K are suitably used as the insulation layer 104 of the containment basket 102. One such alternative thermal insulation material is alumina.

The corium retention functionality of the secondary core containment structure 100 has substantial advantages over other ex vessel retention approaches that are designed to operate by retaining corium on the floor of the containment structure. The small clearance gap 106 of the secondary core containment structure 100 ensures that the volume of water coming into contact with the corium 16" is minimal, which substantially reduces the potential for steam explosions. The corium 16" is also retained at a large distance from the floor of the containment structure 12, which prevents contact with concrete of the containment 12. The passive natural circulation cooling provided by water in the clearance gap 106 is reduced or eliminated due to the corium 16" filling a portion of the clearance gap 106 and melting the conduits 120 (if they are made of steel or another material with a low melting point compared with the corium temperature). However, thermal cooling via heat conduction through the containment basket 102 into the water flooding the sump 30 may provide some cooling, albeit substantially reduced due to the interposed zirconia insulation 104. Additionally, any cooling mechanisms operating in the pressure vessel 14, e.g. any operational ECC system components, may continue to operate to cool the corium 16".

In some illustrative embodiments, the outer steel support structure 112 comprises a freestanding carbon steel shell that is supported from the concrete at the bottom of the reactor cavity (i.e. sump 30) by bottom supports 134. This structure 112 holds high temperature zirconia insulation boards forming the insulation 104 in the lower portion and refractory fiber matt insulation 130 in the upper portion. The inner surface of the insulation is contained within a thin steel sheet 110 to minimize contamination of the insulation 104 and release of insulation fibers into the rest of containment 12. The lower reactor vessel fits within the secondary core containment structure 100 within limited clearance at the side and bottom (FIG. 4). The clearance gap 106 allows for visual in-service inspection of the outside of the reactor vessel 14 and allows water/steam flow on the outside of the vessel during a core melt that is contained in the pressure vessel 14 (e.g. as shown in FIG. 6). Water inlet pipes or conduits 120 penetrate the secondary core containment structure 100 above the high temperature insulation 104. The inlet piping 120 allows water in the reactor vessel cavity or sump 30 to flow into the secondary core containment structure 100 and directs that flow to the bottom of the reactor vessel 14. From the bottom of the reactor vessel 14, the water will flow upward, cooling the vessel. The lower ends 124 of the pipes 120 are supported from the bottom of the insulation structure allowing the pipe to deform to accommodate thermal expansion. Pipe size is kept small to reduce the heat loss through the secondary core containment structure 100 during normal operation. The pipe section 122 outside of the insulation 104 optionally incorporates an extended perforated section (not shown) to minimize the probability that debris in the reactor cavity will enter and prevent flow through the conduits 120. Alternatively, slots in the insulation and steel support wall, combined with internal flow baffles, can be used to provide inlet flow while minimizing normal heat loss (variant not shown). A set of vents 132 are included near the top of the secondary core containment structure 100 to allow hot water/steam to be vented while cooling the reactor vessel 14 in the event of a core melt event. The vent area is preferably larger than the water inlet flow area to accommodate the presence of low density steam. The total vent area is designed to control heat loss during normal operation. The external flow channel is optionally insulated with multiple reflective layers or with refractory insulation to further reduce heat loss.

The secondary core containment structure 100 accommodates the design basis contingency in which normal plant safety systems are unable to maintain reactor coolant inventory inside the reactor vessel 14. If this should occur, the continued heat generation within the reactor fuel due to radioactive decay will result in melting of the fuel cladding and potentially the steel structure supporting the fuel assemblies. The resulting corium melt 16' (FIG. 6) comprises a pool of molten fissile and structural materials, e.g. uranium dioxide, zirconium oxide and iron, resting on the bottom of the reactor vessel 14. The secondary core containment structure 100 provides defense in depth to minimize release of radioactive materials outside of the containment 12. The first function is to control the flow of water from the reactor vessel cavity 30 to maximize cooling on the outside surface of the lower reactor vessel 14. Water will flow in the coolant pipes 120 and is discharged below the lower vessel head via outlets 122. The hot water and steam generated by cooling the reactor vessel 14 will flow upward around the reactor vessel 14 until it reaches the vents 132 in the upper section of the secondary core containment structure 100.

If the reactor vessel 14 is not adequately cooled due to unexpected hot spots inside the reactor vessel or initial lack of water in the reactor vessel cavity, the molten corium 16" (FIG. 7) will melt through the reactor vessel 14 and come to rest on the high temperature refractory insulation 104 in the containment basket 102 of the secondary core containment structure 100. The corium 16" becomes distributed over the bottom surface radiating energy from radioactive decay upwards to continue heating the remains of the lower reactor vessel 14 and conducting energy through the adjacent walls of the containment basket 102. If water is available in the reactor vessel cavity, the outer metal shell of the secondary core containment structure 100 will remain cool and water will flow into the secondary core containment structure 100, flash to steam, and thereby remove decay heat. Because the amount of water in the clearance gap 106 between the reactor vessel 14 and the secondary core containment structure 100 is limited, the amount of steam generated during the melt-through is also limited. This reduces pressure loads on the secondary core containment structure 100, the reactor vessel cavity and on the containment 12.

Given a long-term water supply to the reactor vessel cavity 30 (e.g., provided by condensate collection gutters, not shown, on the inside of the containment 12), the secondary core containment structure 100 ensures that, with water present, the secondary core containment structure 100 will contain the core debris under a pool of water and isolated from concrete within the containment 12. This eliminates potential concrete/corium interaction that could threaten containment integrity and generate additional hydrogen.

As a further benefit, the secondary core containment structure 100 also serves a beneficial function during normal operation of the nuclear reactor. In conventional reactor designs, a multi-layer metal insulation structure is provided around the reactor core outside of the pressure vessel. This conventional component is replaced by the secondary core containment structure 100 which optionally uses less expensive fibrous insulation 130 over most of the lower vessel surface to limit heat loss. The containment basket portion 102 of the secondary core containment structure 100 uses high density, high temperature insulation 104 which also limits normal heat loss and protects the concrete in the reactor vessel cavity 30 from the effects of excessive temperature. The insulation 104 is contained within a metal structure 110, 112 to minimize the release of insulation fibers into other areas of containment 12.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. An apparatus comprising:
a pressurized water reactor (PWR) including a pressure vessel and a nuclear reactor core comprising fissile material disposed inside the pressure vessel at the bottom of the pressure vessel; and a secondary core containment structure including:
- a containment basket comprising zirconia insulation containing the bottom of the pressure vessel, the containment basket spaced apart from the bottom of the pressure vessel by a clearance gap, the containment basket having an open top located at an elevation above the top of the nuclear reactor core, and
- a radiological containment structure containing the PWR and the secondary core containment structure, the radiological containment structure having a sump in which the bottom of the pressure vessel is disposed; and
- conduits disposed between the containment basket and the bottom of the pressure vessel and having inlets disposed both above the top of the containment basket and in the sump and outlets inside the containment basket, so that water disposed in the sump flows into the conduits via the inlets and discharges into the containment basket via the outlets.

2. The apparatus of claim 1 wherein the clearance gap between the containment basket and the bottom of the pressure vessel is no larger than one meter.

3. The apparatus of claim 1 wherein the containment basket of the secondary core containment structure further includes an inner steel liner and an outer steel support structure with the zirconia insulation disposed between the inner steel liner and the outer steel support structure.

4. The apparatus of claim 3 wherein the outer steel support structure includes bottom supports via which the secondary core containment structure is bottom-supported on a floor of the sump of the radiological containment structure.

5. The apparatus of claim 4 further comprising:
zirconia insulation boards disposed on the floor of the sump of the radiological containment structure.

6. The apparatus of claim 1 wherein the secondary core containment structure further includes a cylindrical collar comprising refractory fiber insulation, the cylindrical collar extending upward from the open top of the containment basket and spaced apart from the pressure vessel by a clearance gap.

7. The apparatus of claim 1 wherein the secondary core containment structure is effective to support the weight of a corium mass comprising the nuclear reactor core in the containment basket of the secondary core containment structure.

8. An apparatus comprising:
a nuclear reactor including a pressure vessel and a nuclear reactor core comprising fissile material disposed inside the pressure vessel at the bottom of the pressure vessel; and a secondary core containment structure including a containment basket comprising insulation with a maximum stable temperature of at least 2200K cladded by steel;

a radiological containment structure having a sump containing the nuclear reactor and the secondary core containment structure; and conduits disposed between the containment basket and the bottom of the pressure vessel and having inlets disposed both above the top of the containment basket and in the sump and outlets inside the containment basket, so that water disposed in the sump flows into the conduits via the inlets and discharges into the containment basket via the outlets, wherein the bottom of the pressure vessel and the nuclear reactor core are disposed inside the containment basket with the containment basket spaced apart from the bottom of the pressure vessel by a clearance gap, and the containment structure has an open top located at an elevation above a top of the nuclear reactor core.

9. The apparatus of claim 8 wherein the containment basket of the secondary core containment structure comprises zirconia insulation cladded by steel.

10. The apparatus of claim 9 wherein the clearance gap between the containment basket and the bottom of the pressure vessel is no larger than one meter.

11. The apparatus of claim 9 wherein the containment basket includes bottom supports via which the secondary core containment structure is bottom-supported on a floor of the sump of the radiological containment structure.

12. The apparatus of claim 9 further comprising:
zirconia insulation disposed on the floor of the sump of the radiological containment structure beneath the nuclear reactor and the secondary core containment structure.

13. The apparatus of claim 9 wherein the secondary core containment structure further includes a cylindrical collar comprising refractory fiber insulation, the cylindrical collar extending upward from a lip of the containment basket.

14. The apparatus of claim 9 wherein the secondary core containment structure is effective to support the weight of a corium mass comprising the nuclear reactor core in the containment basket of the secondary core containment structure.

15. The apparatus of claim 9 wherein the secondary core containment structure further comprises pipes arranged to inject water into the clearance gap between the containment basket and the bottom of the pressure vessel.

* * * * *

UNITED STATES PATENT AND TRADEMARK OFFICE
CERTIFICATE OF CORRECTION

| | | |
|---|---|---|
| PATENT NO. | : 10,147,506 B2 | Page 1 of 1 |
| APPLICATION NO. | : 14/244222 | |
| DATED | : December 4, 2018 | |
| INVENTOR(S) | : John D. Malloy, III et al. | |

It is certified that error appears in the above-identified patent and that said Letters Patent is hereby corrected as shown below:

In the Specification

Column 1, Line 5, please change "Contract No. DE-0000583" to --Contract No. DE-NE0000583--

Column 8, Line 52, please change "102.One" to --102. One--

In the Claims

Column 11, Line 9, in Claim 1, please change "core, and" to --core,--

Column 11, Line 52, in Claim 8, delete the word "and"

Signed and Sealed this
Second Day of April, 2019

Andrei Iancu
*Director of the United States Patent and Trademark Office*